United States Patent [19]
Mitcham

[11] Patent Number: 5,271,742
[45] Date of Patent: Dec. 21, 1993

[54] BELT TENSIONING SYSTEM AND IMPROVED BELT TENSIONER

[75] Inventor: Larry D. Mitcham, Temple, Tex.

[73] Assignee: Texas Instruments Incorporated, Dallas, Tex.

[21] Appl. No.: 906,954

[22] Filed: Jun. 30, 1992

[51] Int. Cl.⁵ ............................................. F16H 7/10
[52] U.S. Cl. .................................... 474/112; 474/135
[58] Field of Search ................ 474/101, 112, 135, 199, 474/197

[56] References Cited

U.S. PATENT DOCUMENTS

| | | | |
|---|---|---|---|
| 3,272,027 | 9/1966 | Wayman | 474/161 X |
| 3,996,810 | 12/1976 | Groff | 474/199 X |
| 4,181,920 | 1/1980 | Cerekas | 235/449 X |
| 4,497,159 | 2/1985 | Lancaster | 53/399 X |
| 4,610,645 | 9/1986 | Donn et al. | 474/112 |
| 4,668,209 | 5/1987 | Kyoosei et al. | 474/199 X |
| 4,689,037 | 8/1987 | Bytzek | 474/135 |
| 4,808,148 | 2/1989 | Holtz | 474/112 |

Primary Examiner—Ramon S. Britts
Assistant Examiner—Roger J. Schoeppel
Attorney, Agent, or Firm—Robert L. Troike; Leo N. Heiting; Richard L. Donaldson

[57] ABSTRACT

An improved belt tensioning system 30 includes an improved tensioner 34 mounted on a fixed post 36. The improved tensioner 34 includes the body 37 having a bore 40 extending therethrough. Located in the bore 40 is an elastomeric material 42 having a Shore A durometer of between 30 and 50. Mounted within the bore 48 in the elastomeric material 42 is a bushing 44 that has a bore 46 therethrough sized to closely receive the post or shaft 36. The elastomeric material has damping characteristics capable of substantially eliminating resonant frequencies from the system. Location of the tensioner 34 on the fixed post or shaft 36 permits the appropriate tension to be applied in the system 30 and the driving auxiliary systems by the tensioner while avoiding the use of conventional belt tensioners 20 which may introduce vibrations or oscillations into the belt drive system.

20 Claims, 3 Drawing Sheets

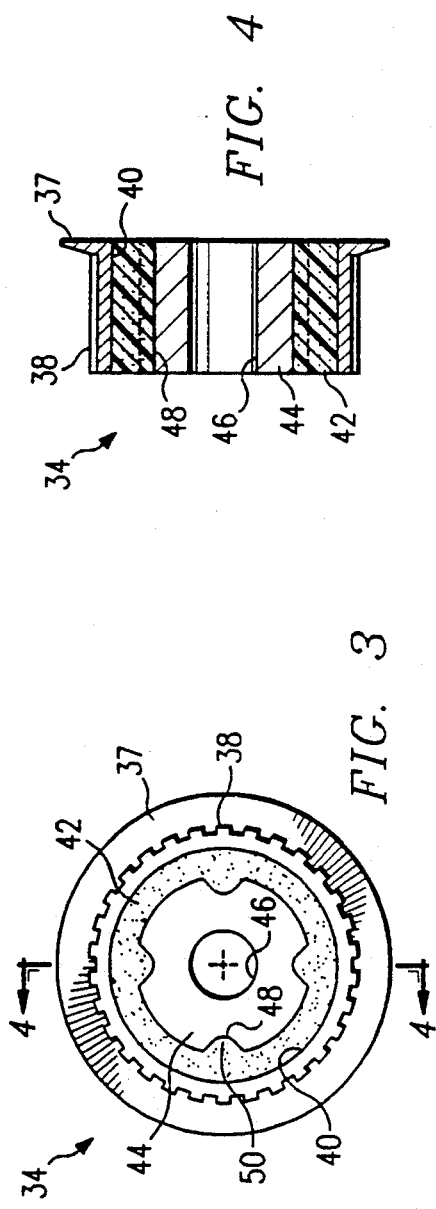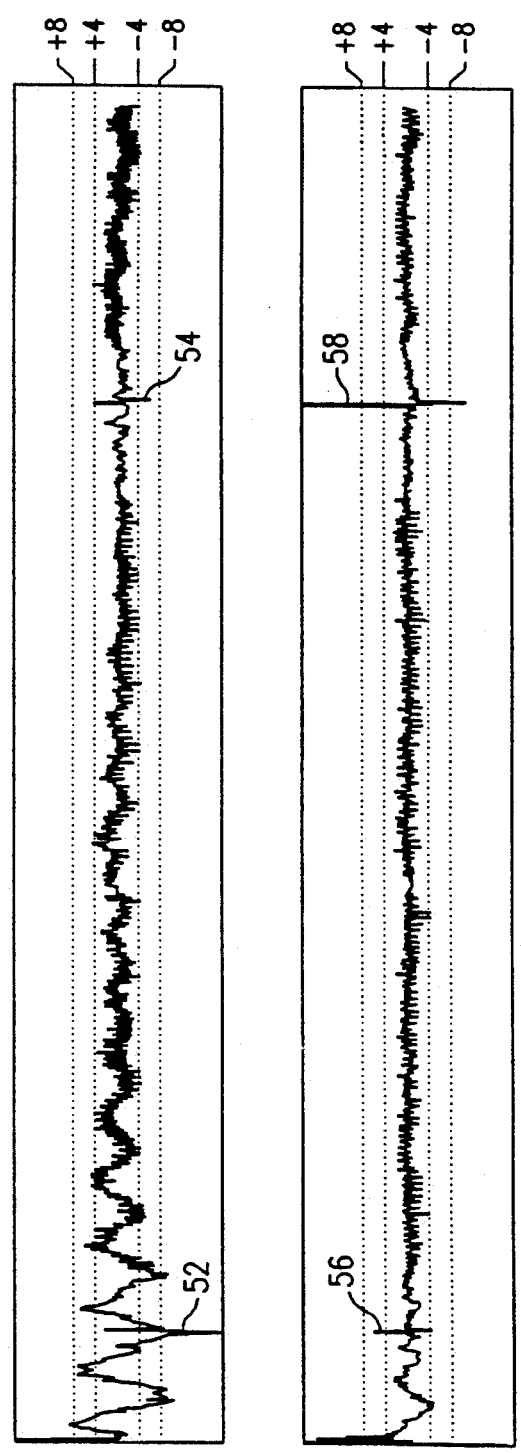
FIG. 3
FIG. 4
FIG. 5
(PRIOR ART)
FIG. 6

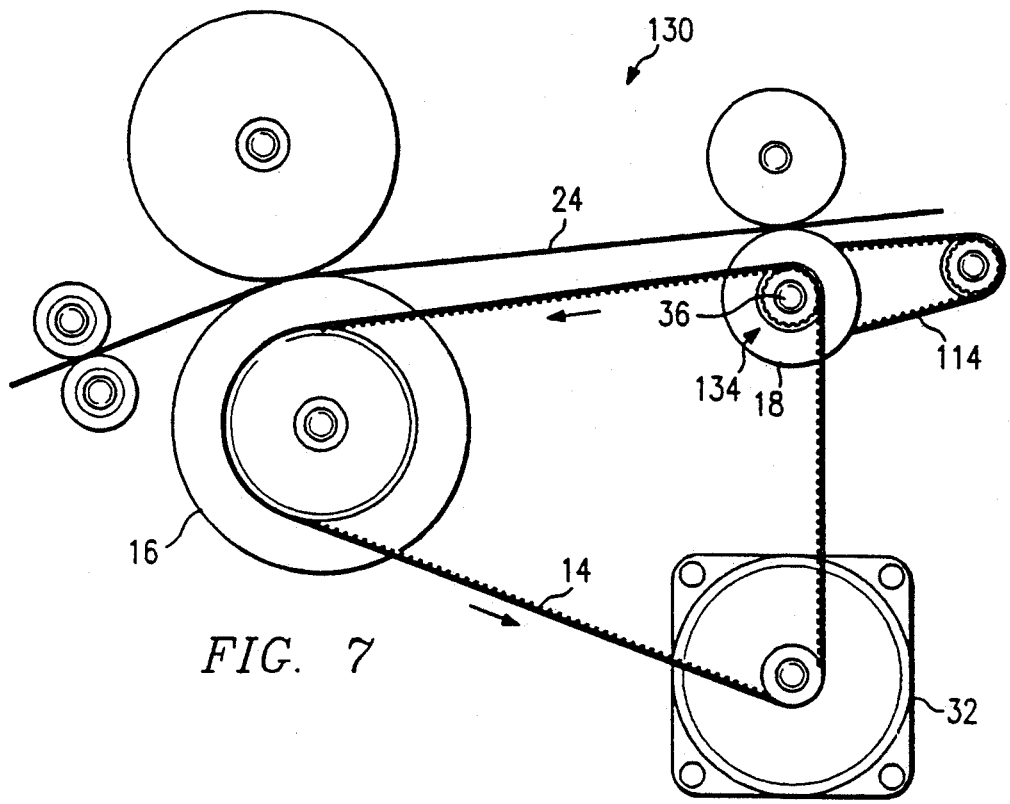
FIG. 7
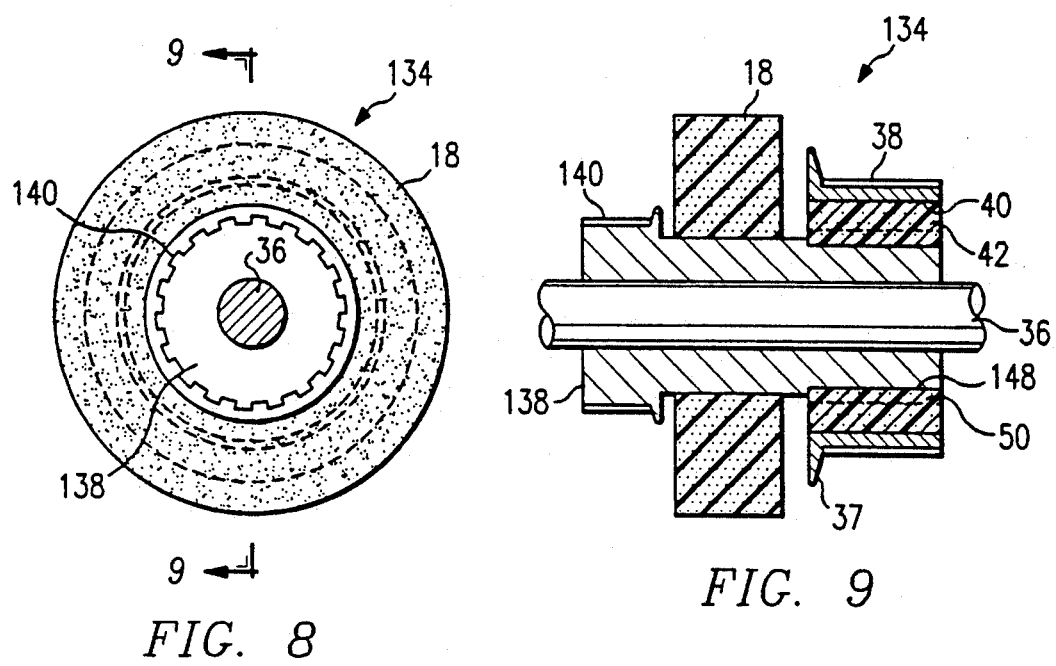
FIG. 8
FIG. 9

BELT TENSIONING SYSTEM AND IMPROVED BELT TENSIONER

TECHNICAL FIELD OF THE INVENTION

This invention relates generally to belt tensioning systems. More particularly, but not by way of limitation, this invention relates to an improved belt tensioner and belt tensioning system for use in ticket printers, readers and the like which require essentially constant velocity belt drive systems.

BACKGROUND OF THE INVENTION

In an effort to expedite ticketing and handling of passengers on the airlines, a magnetic tape is located on the back of ticket coupons. The magnetic tape extends for the length of the coupon and is encoded with all of the information printed on the front of the tape. For example, the ticket holder's name, destination, flight numbers, and dates are among the data printed thereon and encoded on the magnetic strip. To accurately encode the information on the magnetic strip and to accurately read the information thereon, it is necessary that the speed of the coupon moving past the reader/encoder be accurately controlled.

There are regulations governing the configuration of the ticket, location of the magnetic tape and other information on the ticket. So that tickets will be uniform throughout the world, the International Air Transport Association has issued a set of ticketing resolutions. Resolution 20.200 issued by the IATA requires that the velocity of the coupon passing the head is within plus or minus 8 percent of the specified velocity and preferably within plus or minus 4 percent of the specified velocity.

In an effort to comply with these requirements, the industry has had to resort to use of expensive, constant velocity, encoded direct current motors which, when used in the system, increase the cost of the system. Even though such systems are relatively expensive they barely control the velocity within the required specifications.

Even when constant velocity motors are used, it is necessary to provide means for tensioning the belt drive used in the system. One prior art system is illustrated in FIG. 1 and is generally designated by the reference character 10. The system 10 includes a constant velocity d.c. motor 12 which drives a toothed belt 14. The toothed belt 14 is looped over a primary coupon drive wheel 16 and a secondary drive wheel 18 and returns to the motor 12. In the system 10, there is provided a tensioner 20 having a cantilever arm 21 which, through a spring 22, exerts a force on the belt 14 to keep the belt tight, it is necessary to keep the belt tight to eliminate oscillation of the belt and velocity changes in the coupon feed speed that occur as a result.

Apparatus was set up to record the velocity variations of a sample ticket coupon 24 being run through the prior art system 10. The results of the velocity recording are shown in the graph of FIG. 5. As shown therein, the velocity of the coupon was in excess of plus or minus 8 percent initially and gradually dropped to a speed variation of within plus or minus 4 percent. It is possible that much of the initial speed variation is due to inertia of the belt tensioner 20.

One technical advantage of the present invention is that the tensioner includes a damping portion contained within the tensioner body so that the tensioner can be located on a fixed post or shaft. Also, the tensioner does not contain oscillating parts such as the cantilever arm and spring of the prior art systems. Thus, the tensioner itself does not contribute to the speed variation of the belt drive system.

Another technical advantage is that the tensioner, because of its location, assists in absorbing any speed variation that may be imparted due to eccentricities, belt flexure, etc. that may be imparted by other portions of the belt drive system.

A further technical advantage of the invention is that the tensioner can be utilized for driving auxiliary systems since it is mounted on a fixed post or shaft.

SUMMARY OF THE INVENTION

In one aspect, this invention provides an improved tensioner for damping oscillations in a driven member operably connected with the tensioner by means of a belt drive. The tensioner comprises an annular, generally cylindrical body, having a drive surface on an annular periphery of the body for operably engaging the belt drive. The body comprises a resilient material having hardness of about 30–50 Shore A durometer.

In another aspect, this invention provides an improved system for damping oscillations in a driven member. The system includes a non-constant speed driving member operably connected with the driven member by means of a toothed belt drive and a tensioner operably connected with the driving and driven members. The tensioner includes an annular generally cylindrical body having a plurality of circumferentially spaced teeth on an annular periphery of the body for operably engaging the belt drive. The body comprises a resilient material having a hardness of 30–50 Shore A durometer.

BRIEF DESCRIPTION OF THE DRAWINGS

The foregoing and additional objects and advantages of the invention will become more apparent as the following detailed description is read in conjunction with the accompanying drawing wherein like reference characters denote like parts in all views and wherein:

FIG. 1 is a schematic illustration of a belt drive system for feeding ticket coupons through a printer, reader, encoder or the like.

FIG. 3 is an enlarged end view of a tensioner that is constructed in accordance with the invention.

FIG. 4 is a cross-sectional view of the tensioner of FIG. 3 taken generally along the line 4—4 of FIG. 3.

FIG. 5 is a graph illustrating velocity variations in a ticket coupon moving through the prior art system of FIG. 1.

FIG. 6 is a graph similar to FIG. 5, but illustrating velocity variations in a ticket coupon when moving through the system illustrated in FIG. 2.

FIG. 7 is a view similar to FIG. 2, but illustrating the use of a further modification of the tensioner as shown in FIGS. 8 and 9.

FIG. 8 is an enlarged, end view of another modification of tensioner that is also constructed in accordance with the invention.

FIG. 9 is a cross-sectional view taken generally along the line of 9—9 of FIG. 8.

DETAILED DESCRIPTION OF THE INVENTION

Figure 2:
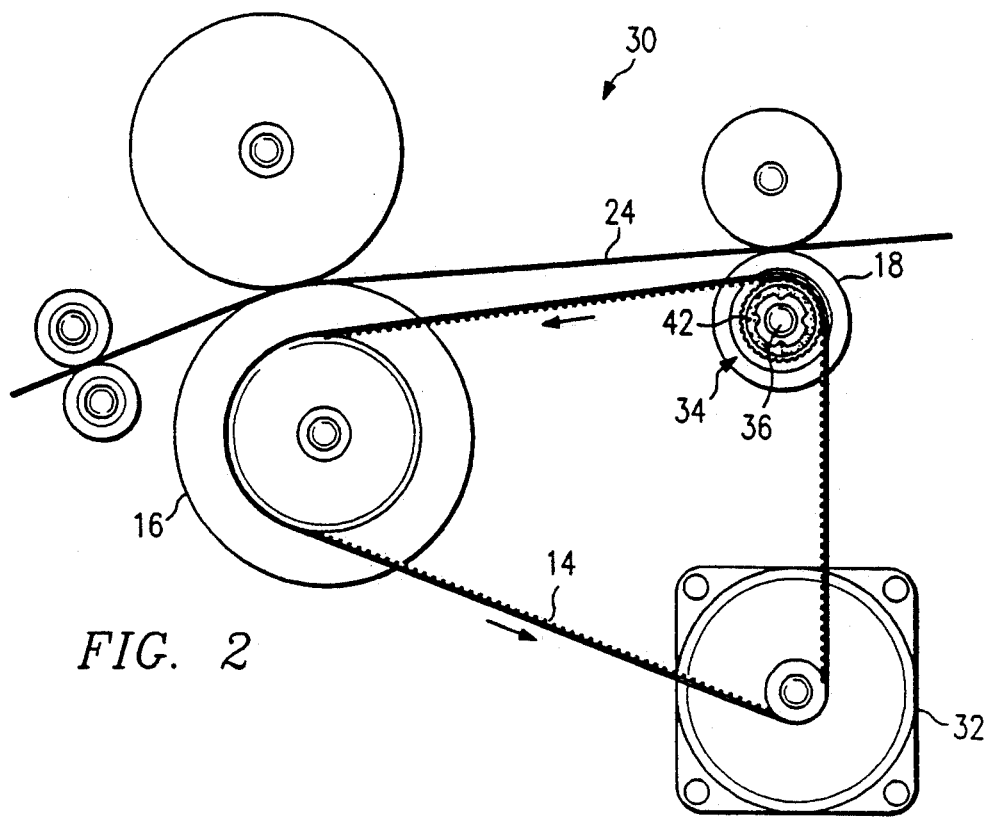
FIG. 2 is a view similar to FIG. 1 but illustrating a belt drive system for feeding ticket coupons through a printer, reader, encoder or the like that is constructed in accordance with the invention.

Referring to the drawing and to FIG. 2 in particular, a belt drive system is generally designated by the referenced character 30 and is used for feeding a ticket coupon 24 through a ticket printer or reader or the like. The system 30 includes a primary drive wheel 16, a stepping motor 32, the toothed belt 14 and a tensioner that is generally designated by the referenced character 34. While a toothed drive belt and system are illustrated, it will be understood that the belt drive system can be smooth.

It will be understood that the mounts on the motor 32 are arranged so that the appropriate amount of initial tension can be placed in the belt 14. It will also be noted in FIG. 2 that the tensioner 34 can be utilized to drive the secondary ticket coupon drive wheel 18 since it is mounted on a fixed post or shaft 36.

The tensioner 34 can be seen more fully in the enlarged views of FIGS. 3 and 4. As shown therein, the tensioner 34 includes a generally cylindrical body 37 having a drive surface thereon including a plurality of circumferentially-spaced teeth 38 meshing with the toothed belt 14 and having a bore 40 extending therethrough. The teeth 38 are located on an outer peripheral surface of the body 37.

An elastomeric core 42 is disposed within the bore 40. Preferably, the elastomeric core is composed of an elastomeric material having a Shore A durometer from 30 to 50 and preferably about 40. A polytetramethyl glycol ether urethane elastomeric was selected because of its compression set and damping characteristics.

The tensioner 34 also includes an inner member or bushing 44 that is disposed within the elastomeric material 42. The bushing 44 has an opening or bore 46 therein that is sized to closely receive the shaft 36. It will be noted that the exterior of the bushing 44 is provided with a plurality of indentations 48 that extend axially of the tensioner 34 and are arranged to receive spline-like portions 50 on the elastomeric material 42. If desired, the material 42 can be bonded to the bushing 44 and body 37.

In the actual manufacture of the tensioner 34, it is preferred that the body 37 of the tensioner 34 be held in position relative to the bushing 44 and that the elastomeric material 42 be subsequently poured or injected into the cavity therebetween. That is, injected into the bore 40 filling the space between the interior of the body 37 and the exterior of the bushing 44.

The preferred form of the tensioner member 34 is as described in connection with FIGS. 3 and 4. However, it should be noted that a tensioner could be constructed entirely from an elastomeric material having the appropriate durometer and having a toughness adequate to drive the secondary drive wheel 18 if desired. The secondary drive wheel 18 may be connected to the tensioner 34 as described in connection with FIGS. 8 and 9.

In operation, the stepping motor 32 is actuated to rotate the belt 14 in the direction of arrows driving the primary drive wheel 16 pulling the ticket coupons 24 through the system 30 at the desired velocity. The elastomeric material 42 in the tensioner 34 has sufficient resiliency to maintain a constant tension in the belt 14 as is accomplished by the tensioner 20 shown in prior art system 10. However, the tensioner 34 does not have the spring 22 connected thereto nor is the tensioner mounted on the cantilever arm 21 which tends to oscillate and thus set up variations in the velocity of the belt 14. Accordingly, the system 30 and the tensioner 34 therein not only damp oscillations or resonant frequencies set up by other components of the drive system, but also do not impart any such oscillations because of their structure such as is the case with the tensioner 20.

Figure 1:
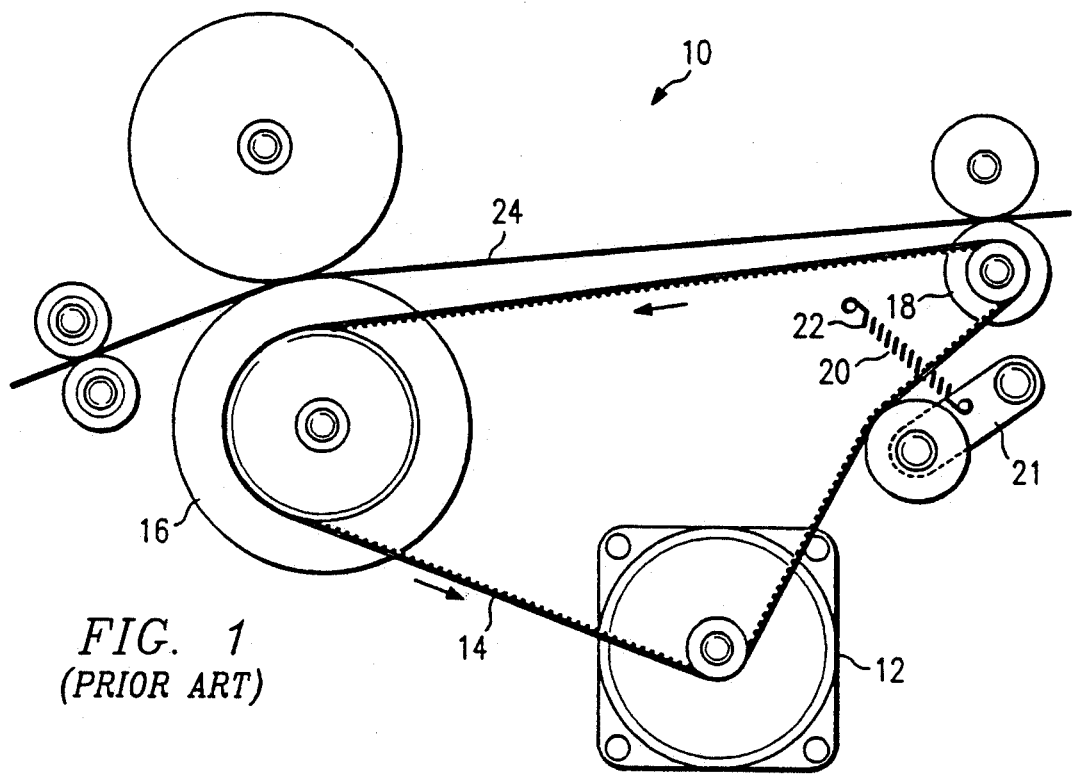

A comparison of the ticket coupon velocities in the system 10 and in the system 30 can be seen in the graphs of FIGS. 5 and 6. FIG. 5 is a graph of the velocity variation in the ticket coupon 24 when using the damping system 20 as illustrated in FIG. 1. A line halfway between plus 4 and minus 4 would represent 0 variation in the velocity of the ticket coupons 24. It will be appreciated that some variation velocity does occur no matter what type of system is utilized.

Anomalies shown at 52 and 54 on the FIG. 5 are due to perforations in ticket coupon 24. Similar anomalies 56 and 58 can be seen in FIG. 6.

A comparison of the two figures illustrates the relative long time period that occurs in the drive system of FIG. 1 after start-up. The "hunting" is illustrated in the left side of the graph of FIG. 5 and extends virtually halfway through the sample run. In FIG. 6, it can ben seen that the "hunting" abates very quickly and that the speed variations are almost never greater than about plus or minus 2%.

The regulations permit a speed variation of about plus or minus 8% and prefer that the speed variation be within plus or minus 4%. As shown, both systems, once they begin operation, maintain the system within the plus or minus 4% although the spring arm damped prior art system 10 FIG. 1 certainly has a much wider variation in speed than does the system 30 that is damped with the tensioner 34.

One of the significant differences between the systems 10 and 30 is that the system 10 must utilize a constant speed DC motor and encoding system which are very expensive, while system 30 of the invention utilizes a relatively inexpensive stepping motor 32 and, yet, produces results that exceed the ability of the more expensive drive system to maintain the speed of the ticket coupons 24 through the system.

FIG. 7 illustrates a modified form of the constant speed drive system that is designated generally by the referenced character 130. As shown therein, the system 130 is virtually identical with that shown in FIG. 2 except that an auxiliary drive belt 114 is being driven off of a modified form of a tensioner that is generally designated by the reference character 134.

The tensioner 134 is more fully illustrated in the enlarged views of FIGS. 8 and 9. As illustrated therein, the tensioner 134 is mounted for rotation on the shaft 36 and includes a hub or hollow shaft portion 138 having a toothed outer periphery 140 for driving the auxiliary belt 114. To actually perform the function of a tensioner, the tensioner body 37 has been placed onto the shaft 36. The elastomeric material 42 is located within the bore 40. It will be noted that there is no inner member or bushing 44 located within the elastomeric material 42. Instead, cylindrical hub 138 has been provided with a plurality of axially extending grooves 148 that are sized to receive the splines 50 formed in the elastomeric material 42. Thus, the tensioner body 37 is coupled to the hub 138 through the material 42 for rotation therewith and in a manner so that the auxiliary drive belt 114 is driven by the hub 138. The secondary drive wheel 18 is also mounted on the hub 138.

The tensioner 134 by virtue of being located on the fixed post 36 can perform several tasks not possible by the tensioner 20. The system 130 clearly illustrates the advantage of having an extensioner 134 mounted on the fixed post 36. The secondary drive wheel 18 is mounted thereon eliminating the need for a second shaft, and the auxiliary drive 114 can be driven thereby since the position of the tensioner 134 is located by the fixed shaft 36. The system 10 is isolated from undesirable drag variations from the auxiliary drive by the tensioner 134 enabling the auxiliary drive to be used as desired.

The systems 30 and 130 utilizing the tensioners 34 and 134 eliminate the need for the cantilever arm, springs, shafts, etc. involved with the tensioner 20. Therefore, in addition to being more effective in speed control, the systems 30 and 130 are simpler, more easily manufactured and maintained, and less expensive.

What is claimed is:

1. A tensioner in combination with in a driven member operably connected with said tensioner by means of a belt drive, said transistor damping oscillations in said driven member an comprising a generally cylindrical body having a drive surface on an annular periphery of said body for operably engaging the belt drive, said body comprising an elastomeric material having a hardness of from 30 to 50 Shore A durometer.

2. The tensioner of claim 1 wherein said body has a Shore A durometer of about 40.

3. The tensioner of claim 1 wherein said body has a central bore and has at least one spline member projecting into said bore generally parallel to a center-line of said bore.

4. The tensioner of claim 1 wherein said belt drive includes a toothed belt and said drive surface includes mating teeth.

5. A tensioner in combination with in a driven member operably connected with said tensioner by means of a belt drive, said tensioner damping oscillations in said driven member and comprising:
   an annular outer member having a bore therethrough and having a drive surface on an outer periphery thereof; and
   an annular inner member located in the bore in said outer member having a bore therethrough and having an outer periphery secured to said outer member, said 10 inner member comprising an elastomeric material and having a Shore A durometer of from 30 to 50.

6. The tensioner of claim 5 wherein said inner member has a Shore A durometer of about 40.

7. The tensioner of claim 5 and also including an annular third member located within the bore in said inner member, said third member comprising a material having a hardness greater than said inner member.

8. The tensioner of claim 7 wherein said inner member, outer member and third member are bonded to each other.

9. The tensioner of claim 5 wherein said belt drive includes a toothed belt and said drive surface includes mating teeth.

10. An improved system for damping oscillations in a driven member, said system including:
    a non-constant speed driving member operably connected with said driven member by means of a toothed belt drive; and
    a tensioner operably connected with said driving and driven members, said tensioner including an annular generally cylindrical body having a plurality of circumferentially spaced teeth on an annular periphery of said body for operably engaging said belt drive, said body comprising an elastomeric material having a hardness of from 30 to 50 Shore A durometer.

11. The system of claim 10 wherein said body has a Shore A durometer of about 40.

12. The system of claim 10 wherein said body has a central bore and has at least one spline member projecting into said bore generally parallel to a center-line of said bore; and said system also including a generally cylindrical hub portion having a recess in a surface thereof for receiving said spline member.

13. The system of claim 10 and also including a fixed position shaft rotatably supporting said tensioner.

14. The system of claim 10 wherein said tensioner also includes a generally cylindrical hub portion connected to said body, said cylindrical hub portion having an annular peripheral portion for drivingly engaging a second belt drive.

15. An improved system for damping oscillations, in a driven member, said system comprising a non-constant speed driving member operably connected with said driven member by means of a belt drive; and
    a tensioner operably connected with said driving and drive members, said tensioner including an annular outer body member having a bore therethrough and having a drive surface on an outer periphery thereof for engaging said belt drive, and an annular inner member located in the bore in said outer body member having a bore therethrough and having an outer periphery secured to said outer member, said inner member comprising an elastomeric material and having a Shore A durometer of from 30 to 50.

16. The tensioner of claim 15 wherein said belt drive includes a toothed belt and said drive surface includes mating teeth.

17. The system of claim 15 wherein said inner member has a Shore A durometer of about 40.

18. The system of claim 15 and also including a generally cylindrical hub member located within the bore in said inner member, said hub member comprising a material having a hardness greater than said inner member.

19. The system of claim 18 wherein said inner member includes at least one axially extending spline in said second bore; and,
    said hub member has at least one recess arranged to receive said spline.

20. The system of claim 18 wherein said inner member, outer member and third member are bonded to each other.

* * * * *